July 13, 1943.  E. H. TAYLOR  2,324,335
PIPE JOINT
Filed Dec. 20, 1940
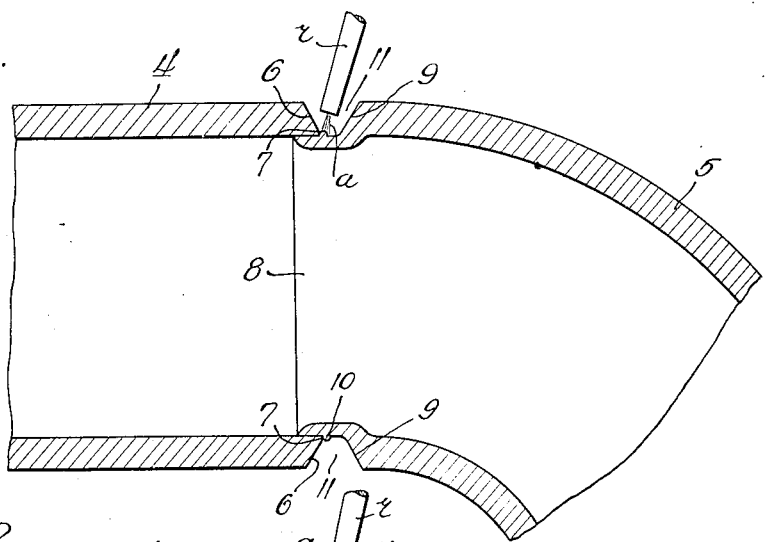
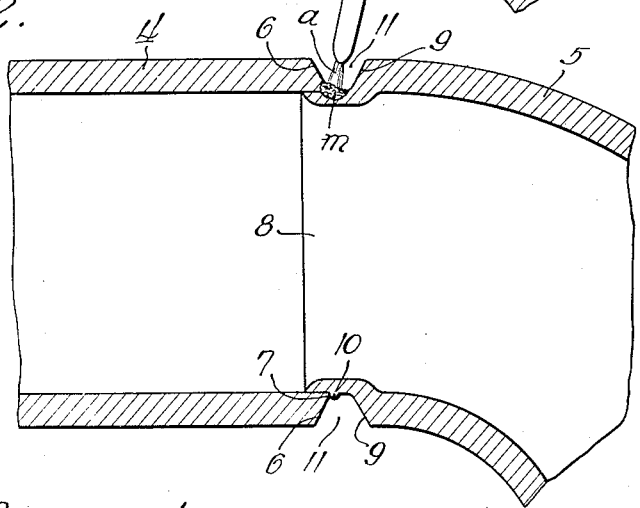
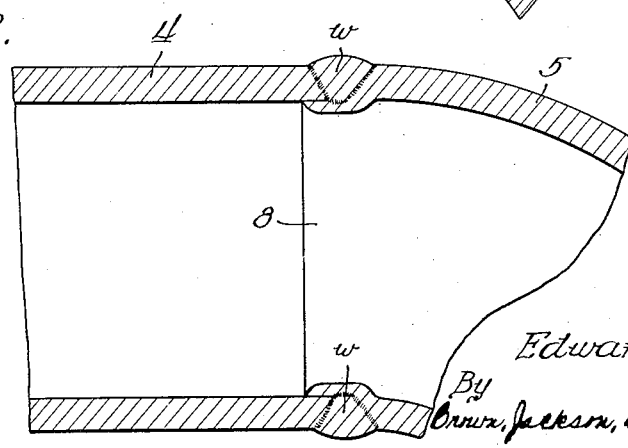
Inventor:
Edward Hall Taylor Patented July 13, 1943

2,324,335

UNITED STATES PATENT OFFICE 2,324,335

PIPE JOINT

Edward Hall Taylor, Chicago, Ill.

Application December 20, 1940, Serial No. 370,999

1 Claim. (Cl. 285—111)

This invention relates to pipe joints, and has to do with welded joints for securing together pipe and pipe fittings.

It is known to provide pipes having beveled ends which, when the pipe lengths are disposed end to end, define a V-shaped welding trough, and to weld the pipe ends together along this trough. It has been found in practice that it frequently is difficult effectively to fuse and weld together the pipe ends at the bottom of the trough, particularly if arc welding with a welding rod is employed, the result being an incomplete weld, lacking penetration and not possessing full strength. A further objection to the known type of joint referred to is that there is risk of molten metal flowing between the end edges of the pipes and congealing within the latter, producing what are known as icicles extending within the run of pipe and offering lodgment for foreign materials, with possibility of eventual clogging of the pipe run, as well as serious interference with flow of fluid through the pipe run.

Various expedients have been resorted to with a view to avoiding the above referred to objections to the above known type of welded pipe joint. One of such known expedients comprises providing one of the pipe ends with a beveled shoulder from the inner or lower edge of which extends a spacing member beyond which the pipe end projects for insertion into a bell at the adjacent end of the other pipe length, the outer end of this bell being beveled and contacting the spacing member. The latter and the beveled end of the bell and the beveled surface of the shoulder together define an inverted flattened V-shaped welding trough. The pipe ends are then welded together along this trough, which is filled in with weld metal. The spacing member remains in contact with the end of the bell during the welding operation and resists relative expansion of the pipe ends, in the zone in which the welding is occurring and where intense heat is generated. As a result, severe stresses are set up which are apt to cause cracking of the weld upon cooling. A further objection is that shrinkage cracks are apt to occur in the region of the area of contact between the end of the bell and the spacing member, due to difficulty in assuring effective welding together of the parts in that area, and the walls of the pipe ends are not welded directly together throughout their entire wall thickness. It has also been proposed to bevel the exterior surface of one of the pipe ends and the interior surface of the other pipe end, so that the exteriorly beveled pipe end fits into the interiorly beveled pipe end, the latter contacting at its extreme end edge an exterior rib on the exteriorly beveled pipe end. The interiorly beveled pipe end is also provided with an exterior bevel which forms, with a portion of the exterior bevel of the other pipe end, a welding trough of extended V-shape. The pipe ends are then welded together along this trough, the rib being fused during the welding operation. This arrangement is objectionable in that the interfitting beveled ends of the pipes prevent relatively movement thereof to accommodate expansion incident to the welding operation, with the result that severe stresses are set up which are apt to result in cracking of the weld upon cooling. A further objection is that the weld does not extend throughout the full wall thickness of the pipe ends, so that the joint does not possess the maximum possible mechanical strength, and shrinkage cracks are apt to occur at the unwelded interfitting portions of the pipe ends. A variation of this form of joint is to have one of the pipe ends provided with an untapered collar which fits into a corresponding recess in the other pipe end. But this variation is subject to all of the objections referred to.

My invention is directed to a pipe joint of simple construction, which permits of the welding operation being performed with expedition and facility and which avoids all of the referred to objections to the known pipe joints above briefly discussed. More specifically, I provide means whereby the welding surfaces of a pipe end and a fitting end, or of two pipe ends, are properly spaced so as to provide therebetween a welding trough of flattened V shape, such that the bottom of the trough is readily accessible when using a welding rod, the parts being so related as to permit of relative movement of the ends in the area of the welding zone while assuring that the weld extends throughout the full wall thickness of both the pipe and the fitting end, or of the pipe ends, and avoiding shrinkage cracks. My invention also includes a novel form of fitting or pipe end and a novel method of welding of the joint resulting from the use of that novel end, with the advantages stated. Further objects and advantages of my invention will appear from the detail description.

In the drawing:

Figure 1 is a fragmentary lengthwise sectional view through a pipe end and a fitting assembled for welding together, the pipe end being of known type and the fitting embodying my invention;

Figure 2 is a view similar to Figure 1 illustrating the first step in the welding operation; and Figure 3 is a view similar to Figure 2 after completion of the welding operation.

In the drawing, I have shown a pipe end 4 and a member 5, which may be an elbow or other fitting, disposed end to end for welding together. The pipe end 4 may be of known type and is provided with a beveled end welding surface 6 which is inclined outward toward the other end of the pipe and extends from the outer edge of a flat surface 7, of relatively slight width, extending from the interior surface of pipe 4 radially thereof. This form of pipe end is known and is not included in my invention except in so far as it cooperates with the other elements of the joint, as will be explained more fully presently.

Member 5 may also be considered as a pipe end, for purposes of description, though this member may be a fitting, such as an elbow or any other analogous device, as noted. Member 5 is provided, at the end thereof which is to be welded to pipe end 4, with a concentric lip 8 projecting outward beyond the end of member 5, the latter being defined by an annular wall the end of which is beveled at 9 to provide a welding surface. Lip 8 is offset inwardly of member 5, with its exterior circumferential surface flat lengthwise and extending in the plane of the interior circumferential surface of pipe end or member 5. Lip 8 preferably is of substantially the cross section shown, having its inner surface more or less rounded to avoid any objectionable obstruction of the interior of the pipe, and is provided at its exterior surface with a circumferential bead 10 disposed about midway the length of lip 8 and spaced from the lower or inner edge of beveled welding surface 9 and from the outer end of lip 8. The pipe 4 is of circular cross section, as is member 5, the welding surfaces 6 and 9 being of annular shape in outline, as will be understood. Bead 10 is of relatively slight mass and is about the same height or radial extent as the flat radial surface 7 at the end of pipe 4.

In order to weld pipe end 4 to member 5, lip 8, which has substantially the same exterior diameter as the interior diameter of pipe 4, is inserted into the end of pipe 4 with bead 10 in contact with the flat radial surface 7. With the parts thus assembled, bead 10 serves as a stop member for spacing apart the beveled welding surfaces 6 and 9, these surfaces, together with the intervening portion of lip 8, defining a flattened V-shaped welding trough 11 from the bottom of which extends bead 10 in contact with surface 7. The welding surfaces 6 and 9 are thus suitably spaced apart for introduction into the trough, at or adjacent the bottom thereof, of a welding rod.

In the welding operation a welding rod $r$ is introduced into the trough 11 with its lower end disposed a short distance above the bead 7, as shown in Figure 1. An arc $a$ is struck from the rod $r$ to bead 10, this arc serving to fuse and destroy the bead and spreading to surface 7 of pipe end 4, so as to fuse the inner edge of the pipe end with the bead, the fused metal of the bead and the pipe end, together with a certain amount of metal $m$ from the rod $r$, being puddled in the lower portion of the trough 11, as in Figure 2. The fusing of the bead and of the contiguous edge portion of pipe end 4 assures that the inner edge portion of the pipe end will be welded to lip 8, thus eliminating possibility of formation of a shrinkage crack at the area of contact between the pipe end and the lip. Also, fusing of bead 10 destroys it thus permitting of relative movement between pipe end 4 and the adjacent end of member 5, in the area of the welding zone, which avoids setting up severe stresses such as might cause cracking of the weld upon cooling. As the welding operation proceeds, the trough 11 is filled with weld metal, with a certain excess extending beyond the outer circumferential surfaces of pipe 4 and member 5, producing the completed weld $w$ shown in Figure 3. Since lip 8 is offset inwardly of member 5 a distance equal to the wall thickness of this member, the weld $w$ extends throughout the full wall thickness of both pipe 4 and member 5 assuring a weld of maximum strength therebetween while, as above noted, eliminating possibility of shrinkage cracks and also avoiding severe stresses such as would tend to cause cracks in the weld upon cooling, as above noted.

In applying my invention to lengths of pipe, one end of a pipe length will be formed in the same manner as the end of pipe 4, the other end of the pipe length being formed in the same manner as the end of member 5, including lip 8 and bead 10, as will be understood. When my invention is to be applied to a fitting to be welded between the ends of adjacent pipe lengths, each end of the fitting will be formed with the lip 8 and bead 10 and associated features of member 5, the opposed ends of the adjacent pipe lengths being formed in the same manner as the end of pipe 4. While the end of pipe 4 and the adjacent end of member 5 preferably are formed to provide inclined or beveled welding surfaces, as shown and for the reasons stated, that is not essential to the broader aspects of my invention, within which the welding surfaces may be otherwise suitably formed.

I claim:

As a new article of manufacture, a pipe fitting comprising a tubular wall presenting an annular end surface adapted to be joined by welding with the end of a conventional pipe of uniform interior diameter having at its end an annular welding surface complementary to said annular welding surface of said fitting, the end of said fitting being provided with an annular lip offset inwardly relative to said wall a distance equal to the thickness thereof, said lip being of uniform exterior diameter substantially the same as the interior diameter of the pipe and being adapted for insertion into the pipe end while remaining free therefrom for independent expansion and contraction during the welding operation, said lip having an exterior circumferential bead of relatively slight mass at about its midlength spaced from the inner edge of said annular welding surface and from the outer end of said lip, the latter and said bead cooperating with the pipe end to position said fitting relative to the pipe end and to space the inner edge of the end welding surface of said fitting from the inner edge of the complementary end welding surface of the pipe end a distance materially greater than the thickness of said bead, thereby providing a wide-bottomed welding trough between the end welding surfaces of the pipe end and the fitting during the welding operation and providing a dam for preventing entrance of welding material into the interior of the joined fitting and pipe end.

EDWARD HALL TAYLOR.